United States Patent
Wingert

(10) Patent No.: US 11,761,821 B2
(45) Date of Patent: Sep. 19, 2023

(54) SYSTEM AND METHOD FOR THERMAL IMAGING

(71) Applicant: Basler AG, Ahrensburg (DE)

(72) Inventor: Julian Wingert, Pinneberg (DE)

(73) Assignee: Basler AG, Ahrenburg (DE)

( * ) Notice: Subject to any disclaimer, the term of this patent is extended or adjusted under 35 U.S.C. 154(b) by 0 days.

(21) Appl. No.: 17/547,825

(22) Filed: Dec. 10, 2021

(65) Prior Publication Data

US 2022/0187137 A1 Jun. 16, 2022

(30) Foreign Application Priority Data

Dec. 11, 2020 (EP) ..................................... 20213424

(51) Int. Cl.
| | |
|---|---|
| *G01J 5/24* | (2006.01) |
| *G01J 5/00* | (2022.01) |
| *G01J 5/20* | (2006.01) |

(52) U.S. Cl.
CPC ......... *G01J 5/24* (2013.01); *G01J 2005/0077* (2013.01); *G01J 2005/202* (2013.01)

(58) Field of Classification Search
CPC ............... G01J 5/24; G01J 2005/0077; G01J 2005/202; G01J 5/03; G01J 5/026; G01J 5/22; G01J 5/06; G01J 5/00; H04N 5/33
See application file for complete search history.

(56) References Cited

U.S. PATENT DOCUMENTS

| | | | |
|---|---|---|---|
| 2010/0031992 A1 | 2/2010 | Hsu | |
| 2013/0170517 A1* | 7/2013 | Duraffourg | ............. H01L 31/18 438/54 |

FOREIGN PATENT DOCUMENTS

| | | |
|---|---|---|
| DE | 69216862 T2 | 6/1997 |
| EP | 0964231 A2 | 12/1999 |

OTHER PUBLICATIONS

European Search Report dated May 26, 2021, from the European Patent Office for corresponding European application No. EP 20213424.3.

* cited by examiner

*Primary Examiner* — David P Porta
*Assistant Examiner* — Meenakshi S Sahu
(74) *Attorney, Agent, or Firm* — Reising Ethington P.C.

(57) ABSTRACT

A system with a detector array, a processor unit and a signal interface. The detector array includes a plurality of bolometric measuring cells and a base body. Each measuring cell is configured to detect infrared radiation and to transmit a measurement signal, which is representative of the readings of the measuring cells, to the processor unit. The processor unit is configured to determine a body heat stored by the base body, to determine a predictive value compensated according to the time delay of the respective measuring cell for each current reading, to determine a temperature value corrected according to the measurement error for each current predictive value, and to determine a thermal image based on the current temperature values, allowing an image signal representing the thermal image to be sent from the signal interface. A corresponding method is also provided.

15 Claims, 3 Drawing Sheets

SYSTEM AND METHOD FOR THERMAL IMAGING

CROSS-REFERENCE TO RELATED APPLICATIONS

This application claims the benefit and priority of European Patent Application No. 20213424.3 filed Dec. 11, 2020, the disclosure of which is incorporated by reference as if fully set forth in detail herein.

FIELD

The present disclosure relates to a system and a method for thermal imaging.

BACKGROUND

This section provides background information related to the present disclosure which is not necessarily prior art.

Systems for thermal imaging are generally known from the prior art. Such systems can, for example, be formed by a thermal imaging camera or comprise at least one thermal imaging camera. By means of such a system for thermal imaging, infrared radiation can be detected via the associated detector array and a thermal image can be generated based on the infrared radiation detected by the detector array. The wavelength range of the infrared radiation is preferably between three microns and 20 microns. By means of the systems known from prior art, for example, the temperatures of an ambient area can be detected and a corresponding thermal image that visually represents the temperatures in the ambient area can be generated.

The detector array of the system is often referred to as a detector or a thermal imaging sensor. The detector array comprises a plurality of bolometric measuring cells and a base body. Because of the bolometric measuring cells, the detector array may also be referred to as a bolometric detector array. Each bolometric measuring cell is configured to detect infrared radiation. In particular, each measuring cell is configured to detect infrared radiation in the wavelength range of the near-infrared, mid-infrared, and/or far-infrared wavelength range. For example, each bolometric measuring cell may be designed to detect infrared radiation in the wavelength range between three microns and 20 microns. Thus, each bolometric measuring cell may be designed along the lines of a bolometric measuring cell for detecting infrared radiation.

In a preferred embodiment, the plurality of bolometric measuring cells is arranged in a row one behind the other or in a grid pattern, resulting in multiple measuring cells arranged side by side. The measuring cells are arranged above the base body of the detector array, each measuring cell being connected to the base body via an associated connection, since, in a preferred embodiment, the base body comprises an evaluation circuit which is designed to generate a measurement signal. In addition to the evaluation circuit or as an alternative to the evaluation circuit, the base body can also comprise other material, in particular silicon material. The base body has thermal capacity. If the detector array with the associated measuring cells is directed at a body so that thermal radiation from said body strikes the measuring cells, a heat flow is generated which passes from the measuring cells to the base body via the associated connections. Due to the thermal capacity of the base body, thermal energy is stored by the base body. If thermal radiation from the body impinges on the measuring cells over a longer period of time, the base body of the detector array heats up to such an extent that the thermal energy stored by the base body leads to distorted measurements when the detector array is subsequently used to detect the temperature of another body. This is because the thermal energy stored by the base body of the detector array can flow back to the measuring cells via the connections, leading to a falsification of the temperature detected by the measuring cells.

Therefore, it would be desirable to provide a system and a method which allows a thermal image to be determined quickly and, at the same time, precisely.

SUMMARY

This section provides a general summary of the disclosure, and is not a comprehensive disclosure of its full scope or all of its features.

According to a first aspect of the present disclosure, a system for generating a thermal image includes a detector array, a processor unit and a signal interface. The detector array comprises a plurality of bolometric measuring cells and a base body comprising a predetermined thermal heat capacity. Each measuring cell is directly or indirectly connected to the base body via an associated connection comprising a predetermined thermal conductivity, such that heat is transferable between each measuring cell and the base body. Furthermore, each measuring cell is configured to sense infrared radiation in a detection range associated with the respective measuring cell and as a time delay element comprising a time constant to generate a reading indicative of the sensed infrared radiation, representing a temperature in the detection range of the respective measuring cell and including a measurement error caused by a heat flow across the connection of the respective measuring cell to the base body. The detector array is configured to periodically detect infrared radiation by means of the associated measuring cells, generate a measurement signal representing the readings generated by the measuring cells, and transmit the measurement signal to the processor unit. The processor unit is configured to determine a body heat stored by the base body based on the thermal capacity, on the thermal conductivity, and either directly or indirectly on the measurement signal. Furthermore, the processor unit is configured to determine a predictive value compensated with respect to the time delay of the respective measuring cell for each current reading of each measuring cell, based on the current reading of the respective measuring cell and at least one temporally preceding reading of the same measuring cell, so that the respective predictive value represents a current predictive temperature in the detection range of the respective measuring cell compensated with respect to the time delay. In addition, the processor unit is configured to determine, for each current predictive value, a temperature value in the detection range of the respective measuring cell corrected for the measurement error, based on the respective predictive value, on thermal conductivity, and either directly or indirectly on the current body heat value. The processor unit is also configured to determine a thermal image based on the current temperature values for the detection ranges of the measuring cell. The signal interface is configured to provide an image signal representing the thermal image.

With regard to the detector array and the measuring cells, reference is made to the explanations given at the beginning in an analogous manner. The detector array comprises a plurality of bolometric measuring cells. This plurality may constitute and/or represent the total number of bolometric measuring cells of the detector array. However, it is also possible for the plurality of bolometric measuring cells of the detector array to constitute and/or represent a subset of all bolometric measuring cells of the detector array. This can be the case, for example, if at least one measuring cell or many measuring cells of the detector array are non-functional. Such measuring cells may also be referred to as dead measuring cells. The remaining measuring cells of the detector array that are not dead may constitute the aforementioned plurality of measuring cells of the detector array. However, another predetermined subset of the total measuring cells may also constitute said plurality of measuring cells of the detector array. When reference is made hereinafter to a bolometric measuring cell of the detector array, it preferably means a measuring cell and/or each of the measuring cells of said plurality of measuring cells of the detector array. For instance, the detector array may comprise more than 10,000 bolometric measuring cells, preferably more than 50,000 bolometric measuring cells.

Each measuring cell is directly or indirectly connected to the base body via an associated connection. The respective connection comprises a thermal conductivity so that part of the heat introduced into the respective measuring cell by infrared radiation can be transferred to the base body via the associated connection of the respective measuring cell.

The base body has a predetermined thermal heat capacity. Due to the connection of the respective measuring cell to the base body, the thermal conductivity of the respective connection and the thermal capacity of the base body, the respective measuring cell acts like a time delay element with a time constant in order to generate a reading representing the detected infrared radiation. When infrared radiation impinges on a measuring cell, the thermal conductivity of the associated connection determines how quickly heat can be transferred from the measuring cell to the base body. The resulting heat flow from the measuring cell to the base body causes the temperature of the base body to rise. Said temperature rise is exponential over time. In other words, the base body charges with heat at an exponential rate.

Each bolometric measuring cell of the plurality of measuring cells of the detector array is therefore designed as a delay element with a time constant. Thus, each bolometric measuring cell of said plurality of measuring cells of the detector array may be formed as a first-order delay element. This is true at least in a simplified view of the respective measuring cell. In principle, however, it is also possible for each bolometric measuring cell to be designed as a delay element of a higher order. Preferably, however, a first-order delay element is considered for the respective measuring cell. The delay occurs between the onset of a change in intensity of the infrared radiation at the measuring cell and the reading generated by the respective measuring cell. Each reading generated by the respective measuring cell is therefore time-delayed. The time constant of a delay element describes the characteristic delay. The time constant of a respective measuring cell can be determined, for example, by the product of the thermal resistance of the connection associated with the respective measuring cell and the thermal [capacitance] of the respective measuring cell. The thermal resistance of the respective compound is the reciprocal of the thermal conductivity of the respective compound.

In a preferred embodiment, each measuring cell is connected to the base body via two electrodes as the associated connection to the respective measuring cell. The electrodes can be made of copper, gold or another metal, for example. The base body may include a readout circuit configured to generate the reading of the respective measuring cell. The base body may comprise silicon material and/or other components. The base body is often separated from the measuring cells by a vacuum, with the connections between the measuring cells and the base body protruding through the vacuum. The thermally conductive connection between the measuring cells and the base body is therefore formed at least essentially or exclusively by the aforementioned connections between the measuring cells and the base body. The vacuum between the measuring cells and the base body, on the other hand, has a thermally insulating effect. In addition, a reflector can be arranged on the base body opposite each rear side of the measuring cell.

The evaluation circuit can be functionally assigned to the measuring cells, whereas the evaluation circuit is physically assigned to the base body. The thermal capacity of the evaluation circuit can thus be assigned to the base body, whereas the functionality of the evaluation circuit for generating the reading can be assigned to the respective measuring cell. A common evaluation circuit can be provided for the plurality of measuring cells. Hence, in functional terms, the evaluation circuit can be assigned proportionally to each of the plurality of measuring cells.

The thermal capacity of the base body and the connections of the base body to the measuring cells allow not only a heat flow from the measuring cells to the base body, but also in the opposite direction, namely a heat flow from the base body back to the measuring cells. It may happen that the heat in the base body is not evenly distributed over the base body. This can occur, for example, if the detector array was not previously irradiated homogeneously. A measurement object and the base body each cause a heat flow that acts on the respective measuring cell. The inhomogeneous distribution of heat in the base body influences the heat flow from the base body to the respective measuring cell, which causes a measurement error with respect to the reading and the temperature to be represented by the reading in the detection range of the respective measuring cell. The measurement error of the measuring cell readings is characterized by the inhomogeneous distribution of heat over the base body. Consequently, there is an inhomogeneous distribution of the measurement errors over the measuring cells of the detector array. Each measuring cell can be assigned a detection range that extends orthogonally outward from the outer surface of the respective measuring cell. This detection range may form a cylindrical space with a base area corresponding to the outer surface of the measuring cell. If, for example, the measuring cell has a rectangular base, the detection range associated with the respective measuring cell may be formed by a cylindrical space that also comprises a rectangular base. The detection ranges of the measuring cells may overlap.

This can be the case in particular if the detection ranges assigned to the measuring cells are conical.

If infrared radiation is detected from a detection range of a measuring cell, representing the temperature in the detection range, the reading generated by the measuring cell may include the temperature in the associated detection range and a measurement error. The measurement error may occur when heat flows from the base body to the respective measuring cell during the measurement of the temperature in the detection range, or vice versa. Before explaining how a temperature value corrected for the measurement error can be determined, we will first explain other advantageous features of the system.

In a preferred embodiment, the readings of the measuring cell are recorded at successive measurement times. For example, the readings of the measuring cells can be recorded at a sampling frequency of 50 Hz. The detector array can be designed to generate a measurement data set at successive measurement times, representing the readings of the measuring cells at the respective measurement time. The measurement data sets can therefore also be generated at a frequency of 50 Hz, in particular.

There may therefore be a signal connection between the detector array and the processor unit to transmit the measurement signal from the detector array to the processor unit. The signal connection may be formed by an electrical line, preferably with multiple wires, or by a radio link. The measurement signal represents the readings generated by the measuring cells. Thus, the readings can be transmitted individually from the detector array to the processor unit via the measurement signal. However, it is also possible that the measurement signals in the form of the measurement data sets are transmitted to the processor unit via the measurement signal from the detector array.

The readings representing the temperature in the detection range are thus available to the processor unit via the measurement signal. The temperature is recorded by detecting the infrared radiation from the detection range that impinges on the measuring cell. This infrared radiation can cause a heat flow from the measuring cell to the base body. The heat stored by the base body and the associated distribution of heat over the base body can therefore be determined via the time curve of the readings, the thermal conductivity of the connections between the measuring cells and the base body, and the thermal capacity of the base body. Hence, the invention envisages that the processor unit be configured to determine the body heat stored by the base body, and preferably the distribution of the heat over the base body, based on the thermal capacity, the thermal conductivity and either the measurement signal directly or a quantity derived directly or indirectly from the measurement signal. It is helpful to be familiar with the body heat and the distribution of the body heat in order to determine what measurement error is caused by the heat of the base body via the connection to the respective measuring cell.

Since each measuring cell is designed as a time delay element, a delay occurs between the occurrence of a change in intensity of the infrared radiation acting on the measuring cell and the reading produced by the respective measuring cell. This also results in a time delay between the actual temperature in the detection range and the reading of the respective measuring cell. It is therefore desirable to determine a predictive value that represents the predictive temperature in the detection range of the respective measuring cell compensated for the time delay. In order to achieve this, reference is made to the findings indicating that the exponential progression of the reading is predictable in the event of a sudden change in the intensity of the infrared radiation impinging on the measuring cell in question. This is because the basic course of a step response of a delay element, in particular a first-order delay element, is known from prior art.

If, for example, it is assumed that a bolometric measuring cell is exposed to an infrared radiation which comprises a step-like course, then the successive readings of the bolometric measuring cell can be predicted, which show the characteristic course of a step response of a delay element, in particular a first-order delay element. Based on this knowledge, it is possible that the first two readings are used in response to the step response in order to make a prediction about the reading in the equilibrium state based thereon. In practice, it is often assumed that after the time constant of the delay element or the bolometric measuring cell have been quadrupled or quintupled, a reading is prevalent which, apart from small deviations, corresponds to the static and real reading state in response to the abrupt increase in infrared radiation. Since the basic course of the step response is known, a prediction as to what the reading will be after the time constant has been quadrupled or quintupled can be made merely based on the knowledge of two readings.

The processor unit is therefore configured to determine a predictive value compensated with respect to the time delay of the respective measuring cell for each current reading of each measuring cell, based on the current reading of the respective measuring cell and at least one temporally preceding reading of the same measuring cell, so that the respective predictive value represents a current predictive temperature in the detection range of the respective measuring cell compensated with respect to the time delay. Based on the previous consideration that the basic course of a step response can be predicted for a time delay element, a prediction can be made, in simplified terms, using a predetermined parameter and a difference between the respective current reading and the temporally preceding reading for the same measuring cell, as to which reading will be generated by the respective measuring cell after time constant has been quadrupled or quintupled, at which a steady state, a quasi-static state or an equilibrium state preferably prevails. Under normal circumstances, this would require the time constant to be quadrupled or quintupled. In practice, this time is often too long to wait for. Therefore, a preferred embodiment would envisage for the processor unit to be configured to determine a predictive value for each current reading of each measuring cell compensated by the delay time of the respective measuring cell, based on the current reading of the respective measuring cell and the reading of the same measuring cell acquired immediately before. In other words, a predictive value compensated with respect to the time delay of the respective measuring cell can be determined using two successive readings. The parameter is preferably a factor between 0.5 and 0.8, in particular a factor of 0.632.

Furthermore, it is often the case that the infrared radiation impinging on a measuring cell changes, particularly over a period of time equal to five times the time constant of the measuring cell in question. Therefore, approaches known from prior art are unlikely to produce a reading that is approximate, in quantitative and temporal terms, to the actual correct intensity of infrared radiation or temperature in the detection range sensed by a bolometric measuring cell.

Therefore, the knowledge of time delay elements as well as of two successive readings according to a preferred embodiment is used to determine a predictive value or a predictive temperature for the detection range, which in quantitatively represents the actual infrared radiation impinging on the measuring cell or the temperature actually present in the detection range more or less accurately.

If reference is made hereunder to a temporally preceding reading, this shall preferably refer to the reading that, in temporal terms, was received immediately prior to the respective reading currently received.

A parameter can be assigned to each measuring cell. The parameter can be a fixed value or determined using a formula. In particular, the parameter can be based on or determined by the time constant of the measuring cell so that the processor unit can determine a value for the predictive value based on a differential value between the current reading and the temporally preceding reading and the parameter. In other words, the processor unit may be configured to determine, for each current reading of each measuring cell, a predictive value compensated with respect to the time delay of the respective measuring cell, based on the parameter of the measuring cell and a differential value, wherein the differential value is the difference between the current reading of the respective measuring cell and the temporally preceding reading of the same measuring cell.

Based on the obtained knowledge about the predictive value or the predictive temperature as well as due to the knowledge about the current reading, which represents a temperature in the detection range, a temperature difference between the two previously mentioned values can be determined. This temperature difference, together with further knowledge of the current value of the body heat of the base body, allows a conclusion to be drawn on how large the heat flow is between the respective measuring cell and the base body. This heat flow can be formed from the measuring cell to the base body or vice versa. However, the heat flow causes the measurement error explained above, which is inherent to the reading of the respective measuring cell. The previously explained findings therefore allow a temperature value to be determined for the detection range of a respective measuring cell, wherein the temperature value is the predictive value corrected according to the measurement error in each case. For example, the measurement error can be subtracted from the predictive value to determine the temperature value. The processor unit is therefore configured to determine, for each current predictive value, a temperature value in the detection range of the respective measuring cell corrected for the measurement error, based on the respective predictive value, on thermal conductivity, and either directly or indirectly on the current body heat value. The temperature value is a prediction of the temperature in the detection range, which is also corrected for the measurement error. The temperature value for the detection range of a measuring cell is therefore particularly accurate and available much faster than is possible with previously known methods for recording a temperature in a detection range.

In addition, the processor unit is configured to determine a thermal image based on the current temperature values for the measuring cell detection ranges. The aforementioned explanations for determining the predictive value and the temperature value are carried out for each measuring cell or for each reading of a respective measuring cell. Since the detector array has a plurality of measuring cells, each periodic detection of the measuring cell readings also produces a corresponding plurality of predictive values as well as a corresponding plurality of temperature values. This plurality of temperature values can be used according to the arrangement of measuring cells in the detector array to provide a thermal image, which is preferably an optical representation of the temperature values. In other words, the thermal image may be formed by a plurality of pixels corresponding in arrangement to the arrangement of the measuring cells of the detector array. The color and/or light intensity of the pixels may be determined by the corresponding temperature values or at least be dependent thereon.

The system also comprises a signal interface. The signal interface can be designed separately from the processor unit. The signal interface may, however, also form part of the processor unit. In other words, the signal interface and the processor unit may be designed integrally. The signal interface is configured to provide an image signal representing the thermal image. The signal interface may be configured to transmit the image signal by radio or by cable. For example, the signal interface may be a radio interface or a wired signal interface.

An advantageous embodiment of the system is characterized in that the processor unit is configured to determine a parameter vector representing a heat distribution in the base body based on the thermal capacity, on the thermal conductivity and either directly or indirectly on the measurement signal.

As explained above, the processor unit stores the readings representing the temperature in the detection range via the measurement signal. The temperature is recorded by detecting the infrared radiation from the detection range that impinges on the measuring cells. This infrared radiation can induce a heat flow from each of the measuring cells to the base body. The measuring cells are a part of the detector array of the system, and the measuring cells are preferably arranged in a uniformly distributed manner. For example, the measuring cells may be arranged in a predetermined pattern of rows and columns in a distributed manner. The distribution of heat over the base body can therefore be determined via the time curve of the readings, the thermal conductivity of the connections between the measuring cells and the base body, and the thermal capacity of the base body. In this context, it can also be taken into account that the measuring cells are arranged above the base body. Each measuring cell of the plurality of measuring cells may be associated with a portion of the base body corresponding to a projection area of the respective measuring cell onto the base body. In addition, the processor unit may be configured to determine a partial body heat stored by each part of the base body based on the reading of the respective associated measuring cell, on the thermal capacity of the base body, and on the thermal conductivity of the connection from the respective measuring cell to the respective part of the base body. The processor unit can thus determine a partial body heat of the base body assigned to the respective measuring cell for each measuring cell. The known arrangement of the measuring cells in the detector array can be used to infer a corresponding arrangement of the parts of the base body. Said arrangement may be stored in the processor unit or a storage system allocated to the processor unit. The processor unit may be configured to determine a parameter vector representing a heat distribution in the base body based on the arrangement of the parts of said base body and the associated partial body heat. For example, the parameter vector may include, represent, or be formed from the values of the partial body heat. The parameter vector can be designed as a parameter matrix, which has an associated parameter value for each part of the base body.

An advantageous embodiment of the system is characterized in that the processor unit is configured to determine, for each current predictive value, the temperature value in the detection range of the respective measuring cell corrected with respect to the measurement error based on the respective predictive value, on the thermal conductivity, either directly or indirectly on the current body heat value, and also on the parameter vector. The relevant value of the body heat may be determined by a parameter value of the parameter vector associated with the respective measuring cell. Due to the obtained knowledge about the predictive value or the prediction temperature as well as due to the knowledge about the current reading, which represents a temperature in the detection range, a temperature difference between the two previously mentioned values can be determined by means of the processor unit. This temperature difference as well as the further knowledge about the current value of the body heat of the relevant part of the base body, namely the partial body heat of the part of the base body onto which the respective measuring cell projects, allows a conclusion to be drawn on how large the heat flow between the respective measuring cell and the base body is. This heat flow can be formed from the measuring cell to the base body or vice versa. However, the heat flow causes the measurement error explained above, which is inherent to the reading of the respective measuring cell. The previously explained findings therefore allow a temperature value to be determined for the detection range of a respective measuring cell by means of the processor unit, wherein the temperature value is the predictive value corrected according to the measurement error in each case. For example, the measurement error can be subtracted from the predictive value to determine the temperature value. The processor unit is therefore configured to determine, for each current predictive value, a temperature value in the detection range of the respective measuring cell corrected for the measurement error, based on the respective predictive value, on thermal conductivity, and either directly or indirectly on the current partial body heat value. The temperature value is a prediction of the temperature in the detection range, which is also corrected for the measurement error.

An advantageous embodiment of the system is characterized in that each measuring cell comprises a sensor layer for absorbing infrared radiation, the base body has a substrate with a readout circuit, and each measuring cell is connected to the base body with associated electrodes so that the electrodes of a measuring cell form the connection of the respective measuring cell to the base body. The measuring cell may also be connected to the readout circuit via the associated electrodes. An electrical resistance of a respective measuring cell can thus be detected via the readout circuit and the electrodes, which is representative of the reading of the respective measuring cell. In other words, the reading can be determined based on the electronic resistance detected by the measuring circuit. For this purpose, the readout circuit can be designed accordingly.

The readout circuit may be applied to the substrate and/or integrally integrated into the substrate. The base body can be an uninterrupted base body, and the measuring cells can be arranged in rows or a matrix. The measuring cells may be mechanically and/or materially connected to each other.

Another advantageous embodiment of the system is characterized in that the processor unit is configured to determine the body heat stored by the base body, based on the thermal capacity and on the thermal conductivity and predictive values. By absorbing infrared radiation, a heat flow can be conducted from the measuring cells to the base body via the associated connections, in particular the associated electrodes. The base body exhibits the thermal capacity. The thermal conductivity refers to the thermal conductivity of the connections between the measuring cells and the base body. In particular, in this case, a preferred embodiment would provide that the measuring cells each have the same design, and thus there are also identical connections between the measuring cells and the base body. The thermal conductivity therefore refers to one or many connections. However, since the connections are of the same design, the thermal conductivity can be the same for each of the connections. Therefore, the term "thermal conductivity" can also be used, since this can refer to one of the compounds or to each of the same compounds in each case. The predictive values represent predictive temperatures for the measuring cell detection ranges. Using these predictive temperatures, the thermal conductivity of the connections between the measuring cells and the base body, and the thermal capacity of the base body, the body heat of the base body can be determined. The processor unit can be configured accordingly for this purpose.

In another advantageous embodiment of the system, the processor unit is configured to determine body heat based on the most recently determined body heat, thermal capacity, thermal conductivity, and either the at least one current reading or the at least one current predictive value. The detector array is configured to periodically detect infrared radiation using the associated measuring cells. In a preferred embodiment, therefore, a group of readings representing the readings of the plurality of measuring cells is periodically generated for the plurality of bolometric measuring cells. In a corresponding manner, the body heat, the predictive values and the temperature values can also be determined periodically. In principle, body heat can be calculated, for example, after each determination of a predictive value or after each transmission of a reading to the processor unit. However, it is also possible for the body heat to be determined periodically after each transmission of a group of readings or after the calculation of a group of predictive values. In this case, it is preferred that the most recently determined body heat of the base body is taken into account. Moreover, the thermal capacity of the base body, the thermal conductivity of the connection between the respective measuring cell and the base body, and the at least one current reading or the at least one current predictive value are taken into account when determining the (current) body heat. This can be, for example, a current reading, a current predictive value, a current group of readings, or a current group of predictive values. Preferably, based on the last determined body heat and the thermal capacity of the base body, a temperature of the base body can be concluded. This can be used in comparison to the temperature according to the current reading or the current predictive value to infer a heat flow that may occur from the respective measuring cell to the base body, or vice versa, by means of the corresponding difference and thermal conductivity. Based on this knowledge, the current body heat of the base body can in turn be inferred. The processor unit may be configured to perform the previously explained steps individually or sequentially. When determining the body heat for the first time, a predetermined body heat may be assumed to be the most recently determined body heat. The processor unit may store the predetermined body heat as a corresponding value.

Another advantageous embodiment of the system is characterized in that the processor unit is configured to determine a body temperature of the base body based on the thermal capacity of the base body and the current value of the body heat, and wherein the processor unit is configured to determine, for each current predictive value, the temperature value corrected according to the measurement error in the detection range of the respective measuring cell based on the predictive value of the respective measuring cell, the thermal conductivity of the connection to the respective measuring cell, and the current value of the body temperature of the base body. The processor unit can thus, for example, determine the body temperature of the base body from the product of the thermal capacity of the base body and the current value of the body heat. The resulting indirect current value of the body temperature can be used by the processor unit to determine a heat flow that occurs via the connection of the respective measuring cell to the base body, or vice-versa. This is because, in a preferred embodiment, the actual heat flow from or to a measuring cell via the associated connection is determined from the product of the thermal resistance, which is the reciprocal of the thermal conductivity of the respective connection, and the difference between the actual body temperature and the predictive temperature of the respective measuring cell represented by the predictive value. The processor unit may therefore be configured to detect the heat flow accordingly. The measurement error is preferably proportional to the heat flow. For example, the measurement error may be determined based on the value of the heat flow and a predetermined proportional factor. Thus, the processor unit may be configured to determine the measurement error based on the product of the value of the current heat flow and a predetermined proportional factor. In addition, the processor unit may be configured to determine the current temperature value by subtracting a temperature variable represented by the measurement error from the predictive temperature represented by the respective predictive value. In other words, the processor unit may be configured to determine the temperature value for the detection range of a measuring cell by subtracting a temperature variable according to the measurement error from the predictive temperature for the respective measuring cell. This allows the temperature value for the detection range of each of the measuring cells to be determined. The processor unit may be configured accordingly for this purpose.

Another advantageous embodiment of the system is that the detector array is configured in such a way that each measuring cell periodically detects the infrared radiation in the associated detection range with a measuring period that is less than the time constant of the respective measuring cell, so that each reading comprises a time delay error. Although the measuring period is smaller than the respective time constant of the associated measuring cell, the system allows a particularly fast and at the same time precise determination of the temperature value for the detection range of the respective measuring cell. Furthermore, a measuring period that is shorter than the time constant of the respective measuring cell makes it possible for the detector array to periodically detect the infrared radiation in the detection range of the measuring cells at a particularly high frequency. It follows that the thermal image can be updated correspondingly often and that the image signal can provide current thermal images with a short time delay.

Another advantageous embodiment of the system is characterized in that the time constant of each measuring cell is determined by a thermal resistance of the respective measuring cell and a thermal capacitance of the respective measuring cell. This allows a particularly accurate determination of the time constant for each of the measuring cells. Preferably, the measuring cells are designed the same so that the time constant is the same for each of the measuring cells.

A further advantageous embodiment of the system is characterized in that the measuring period is less than half the time constant of the respective measuring cell. This also allows a high frequency of periodic detection of infrared radiation in the detection range of the measuring cells as well as current thermal images with a low delay rate and also a correspondingly current image signal to be generated.

A further advantageous embodiment of the system is characterized in that the processor unit is configured to determine the predictive value for the predictive temperature in the detection range of a respective measuring cell by extrapolating the readings of the respective measuring cell or by multiplying a differential value, which is determined by the difference between the current reading of the respective measuring cell and a previous reading of the same measuring cell, by a predetermined factor of between 0.5 and 0.8, in particular by a factor of 0.632. Based on the difference between the current reading of the measuring cell and the immediately preceding reading of the measuring cell, an estimated prediction can be made as to which value the reading of the measuring cell will assume in the event of a step response. For example, it is known from prior art that the step response takes an approximately linear course in the time between 0 and the time corresponding to the time constant, so that the value of the reading after the time corresponding to the time constant has already reached 63.2% of the final, expected statistical value of the step response. If a prediction about the final statistical value to be expected can already be made based on this linear progression, a parameter or a factor based on the time constant can be generated which, using the difference between the two readings, allows a conclusion to be drawn on which value the reading assumes in a statically steady state, which is preferably the case after the time constant has been multiplied by five. If the touchdown point of the step response is not novel, but determined by the previous reading, this can also be taken into account to quantitatively determine the correct expected reading in the steady state. An advantageous embodiment of the system is characterized, for example, in that the processor unit is configured to determine the predictive value for the predictive temperature in the detection range of the respective measuring cell by multiplying the differential value, which is determined by the difference between the current reading of the respective measuring cell and a previous reading of the same measuring cell, by a characteristic value between 1.6 and 1.2, in particular by a characteristic value of 1.58. The characteristic value of 1.58 corresponds to the reciprocal value of 63.2%, i.e. the proportional value of the step response after the time corresponding to the simple time constant has elapsed.

Another advantageous embodiment of the system is characterized in that the detector array is designed so that the measuring cells periodically detect the infrared radiation in the associated detection ranges at a frequency of at least 20 Hz. Thus, at a frequency of 20 Hz, for example, 20 thermal images per second can be generated. In a preferred embodiment, the frequency is greater than 20 Hz. For example, the frequency can be at least 30 Hz, at least 40 Hz, at least 50 Hz, or at least 100 Hz. The system according to the invention is particularly advantageous at higher frequencies. This is because the linear increase of the step response of a delay element, in particular a first-order delay element, can be used in a particularly advantageous way if a very short time interval of the step response is in question, which is smaller than the time constant of the respective delay element. In this case, the temperature values in the detection range can be accurately determined at a fast pace and at the same time with a low error rate, even if the infrared radiation in the detection range changes rapidly. This is no longer possible with ordinary bolometric measuring systems.

A further advantageous embodiment of the system is characterized in that the processor unit is configured to filter the readings received via the measurement signal by means of a low-pass, whereby the resulting readings serve to determine the body heat and/or predictive values. The low-pass filter may be formed by a configuration of the processor unit. In other words, the processor unit may be configured to perform the low-pass filtering of the readings. Noise in the readings may thus be suppressed.

According to a second aspect of the invention, the above-mentioned task is solved by a method comprising the features of claim 13.

Hence, a method for thermal imaging by means of a system comprising a processor unit, a signal interface and a detector array is provided. In this context, the detector array comprises a plurality of bolometric measuring cells and a base body comprising a predetermined thermal capacity. Each measuring cell is directly or indirectly connected to the base body via an associated connection comprising a predetermined thermal conductivity, such that heat is transferable between each measuring cell and the base body. Each measuring cell is configured to sense infrared radiation in a detection range associated with the respective measuring cell and as a time delay element comprising a time constant to generate a reading indicative of the sensed infrared radiation, representing a temperature in the detection range of the respective measuring cell and including a measurement error caused by a heat flow across the connection of the respective measuring cell to the base body. The method comprises the following steps a) to h): a) periodically detecting infrared radiation by means of the measuring cells of the detector array; b) generating a measurement signal representing the measurement values generated by the measuring cells by means of the detector array; c) transmitting the measurement signal from the detector array to the processor unit; d) determining a body heat stored by the base body by means of the processor unit and based on the thermal capacity, on the thermal conductivity and either directly or indirectly on the measurement signal; e) determining a predictive value for each current reading of each measuring cell compensated with respect to the time delay of the respective measuring cell by means of the processor unit and based on the current reading of the respective measuring cell and at least one temporally preceding reading of the same measuring cell, so that the predictive value represents a current predictive temperature in the detection range of the respective measuring cell compensated with respect to the time delay; f) determining, for each current predictive value, a temperature value corrected for the measurement error in the detection range of the respective measuring cell by means of the processor unit and based on the respective predictive value, on the thermal conductivity and either directly or indirectly on the current value of the body heat; g) determining a thermal image by means of the processor unit and based on the current temperature values for the detection ranges of the measuring cells; and h) providing an image signal using the signal interface, wherein the image signal represents the thermal image.

For the method according to the second aspect of the invention, reference is made to the advantageous explanations, preferred features, effects and/or benefits as explained in connection with the system according to the first aspect of the invention, at least in an analogous manner. The method thus offers the advantage, for example, that temperature values can be determined for the detection ranges of the measuring cells that particularly accurately represent the actual temperature in the detection ranges. In addition, the temperature values can be determined particularly rapidly and without time delay. Finally, the method enables thermal imaging based on the detected temperature values, as well as the provision of an image signal representing the thermal images. The thermal images and the image signal can thus also be a particularly precise indication of the temperatures in the detection range with a relatively small time delay.

With regard to the advantageous embodiments of the method reproduced below, reference is made to the advantageous explanations, preferred features, effects and/or advantages in an analogous manner as explained for the system according to the first aspect of the invention and/or one of the associated advantageous embodiments of the system.

An advantageous embodiment of the method is characterized in that the method comprises a further step d.1) to be carried out before step e) or f): Determining a parameter vector representing a heat distribution in the base body by means of the processor unit based on the thermal capacity, on the thermal conductivity and either directly or indirectly on the measurement signal.

An advantageous embodiment of the method is characterized in that the body heat stored by the base body is determined in step d) based on the thermal capacity, on the thermal conductivity and on the predictive values by means of the processor unit.

A further advantageous embodiment of the method is characterized in that the current body heat is determined in step d) based on the most recently determined body heat, thermal capacity, thermal conductivity, and either the at least one current reading or the at least one current predictive value by means of the processor unit.

A further advantageous embodiment of the method is characterized in that the method comprises a further step e.1) to be carried out before step f): e.1) Determining a body temperature based on the thermal capacity of the base body and the current value of the body heat by means of the processor unit; whereby in step f), a temperature value in the detection range of the respective measuring cell corrected with respect to the measurement error is determined by means of the processor unit for each current predictive value based on the predictive value of the respective measuring cell, the thermal conductivity of the connection of the respective measuring cell and the current value of the body temperature of the base body.

A further advantageous embodiment of the method is characterized in that in step f), for each current predictive value P, the temperature value corrected with respect with the measurement error in the detection range (16) of the respective measuring cell (10) is determined by means of the processor unit (6) and based on the respective predictive value P, on the thermal conductivity, either directly or indirectly on the current value of the body heat and additionally based on the parameter vector.

A further advantageous embodiment of the method is characterized in that in step a) the infrared radiation is periodically detected by means of each measuring cell in the associated detection range with a measuring period that is shorter than the time constant of the respective measuring cell, so that each reading presents a time delay error.

Another advantageous embodiment of the method is characterized in that the time constant of each measuring cell is determined by a thermal resistance of the respective measuring cell and a thermal [capacitance] of the respective measuring cell.

A further advantageous embodiment of the method is characterized in that the measuring period is less than half the time constant of the respective measuring cell.

A further advantageous embodiment of the system is characterized in that the predictive value is determined in step d) by means of the processor unit for the temperature in the detection range of a measuring cell by extrapolating the readings of the respective measuring cell or by multiplying a differential value, which is determined by the difference between the current reading of the respective measuring cell and a previous reading of the same measuring cell, by a predetermined factor of between 0.5 and 0.8, in particular by a factor of 0.632.

A further advantageous embodiment of the method is characterized in that the measuring cells in step a) periodically detect the infrared radiation in the associated detection ranges at a frequency of at least 20 Hz.

A further advantageous embodiment of the method is characterized in that step c) comprises a partial step c.1): low-pass filtering of the readings received via the measurement signal by means of the processor unit, so that the resulting readings are used to determine the body heat and/or predictive values.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
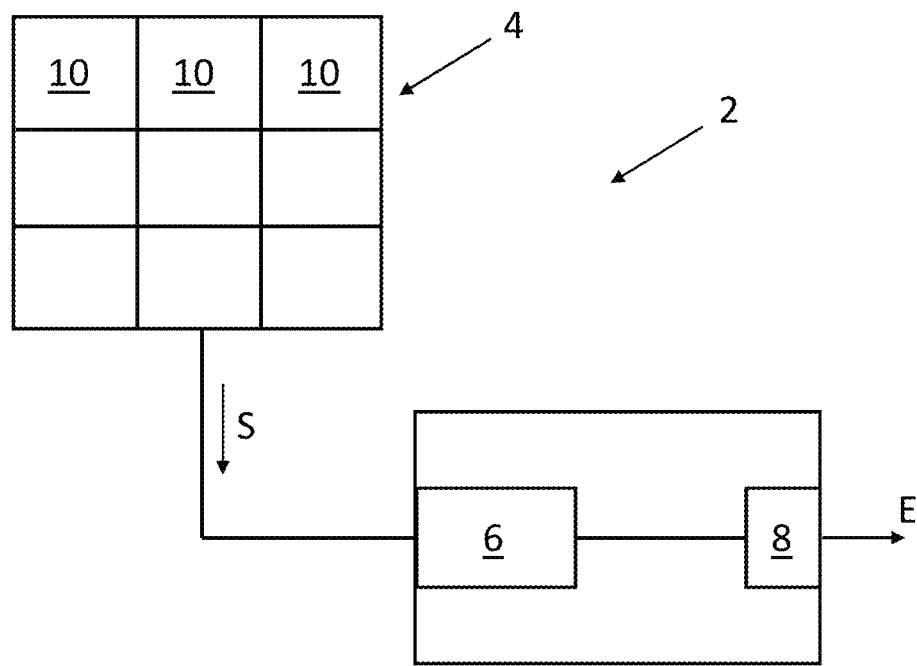
FIG. 1 is a schematic view of an exemplary system constructed in accordance with the teachings of the present disclosure.

FIG. 1 shows an advantageous embodiment of system 2 in a schematic representation. The system 2 comprises a detector array 4, a processor unit 6 and a signal interface 8. The signal interface 8 is configured to provide an image signal E representing the thermal image. The system 2 is therefore used for thermal imaging.

Figure 2:
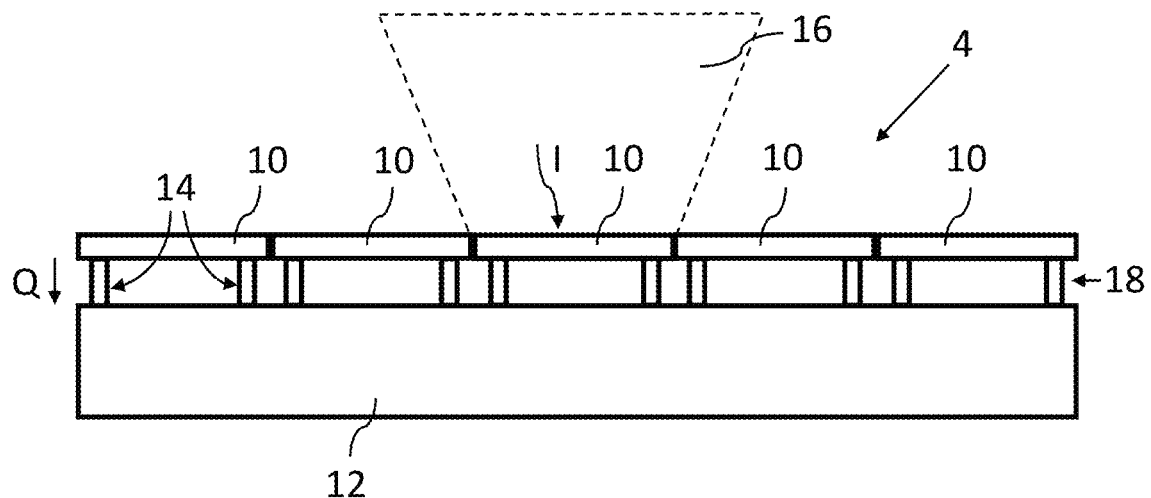
FIG. 2 is a schematic cross-sectional view of a portion of the system of FIG. 1 illustrating a detector array.

FIG. 2 shows the detector array 4 of the system 2 in a schematic cross-sectional view. The detector array 4 comprises a plurality of bolometric measuring cells 10 and a base body 12. The base body 12 has a predetermined thermal heat capacity. For brevity, the thermal heat capacity of the base body 12 is also referred to as the thermal capacity of the base body 12.

Each measuring cell 10 is designed to detect infrared radiation I in a detection range 16 assigned to the respective measuring cell 10. The measuring cell 10 is heated by the sensed infrared radiation I. Each measuring cell 10 is connected to the base body 12 via an associated connection 14. Each connection 14 between the respective measuring cell 10 and the base body 12 has a predetermined thermal conductivity. Heat can thus be transferred from the measuring cell 10 to the base body 12, and in the reverse direction, via the associated connection 14 associated with a measuring cell 10. In a preferred embodiment, an insulating layer 18 is formed between the measuring cells 10 and the base body 12. This insulation layer 18 may be composed of air, in particular a space that is virtually under vacuum. The insulating layer 18 is thus arranged between the base body 12 and the plurality of measuring cells 10. In a preferred embodiment, the measuring cells 10 are arranged in a common plane. The measuring cells 10 can be arranged in a row or a line. In a preferred embodiment, however, the measuring cells 10 are arranged in matrix form, i.e. in a plurality of rows and lines, as can be seen in the schematic representation of FIG. 1.

The connection 14 associated with a measuring cell 10 passes through the insulating layer 18 to the base body 12. A preferred embodiment provides that each of the connections 14 is electrically conductive in order to be able to detect an electrical resistance of the respective measuring cell 10, but the connection 14 should be able to transport as little heat as possible per time unit. This is to prevent thermal energy transmitted to the respective measuring cell 10 by infrared radiation I from being transferred to the base body 12. In practice, however, this cannot be completely ruled out. Often, the connection 14 associated with a measuring cell 10 is formed by two electrically conductive leads, for example of copper or gold, which act as electrodes for the respective measuring cell 10. Each of the measuring cells 10 is designed as a bolometric measuring cell. Their electrical resistance therefore changes by virtue of the temperature of the respective measuring cell 10.

An evaluation circuit (not shown) may be associated with the base body 12, which is coupled to the plurality of measuring cells 10 via the connections 14. Via the coupling, the evaluation circuit can detect the electrical resistance of the measuring cells 10 and thus provide a corresponding reading for each of the measuring cells 10. The evaluation circuit is functionally associated with each of the measuring cells 10 proportionally. Thus, when a measuring cell 10 is referred to as a reading, this is preferably the reading for the respective measuring cell 10 provided with the aid of the evaluation circuit. However, as far as thermal capacity is concerned, the evaluation circuit is assigned to the base body 12. This means that thermal heat transferred from one of the measuring cells 10 to the base body 12 via the associated connection 14 and stored by the material of the base body 12 may also be stored proportionally by the material of the evaluation circuit.

Each of the measuring cells 10 is configured as a time delay element with a time constant T for generating a reading M representing the sensed infrared radiation I, which represents a temperature in the detection range 16 of the respective measuring cell 10 and includes a measurement error caused by a heat flow Q across the connection 14 of the respective measuring cell 10 to the base body 12.

Figure 3:
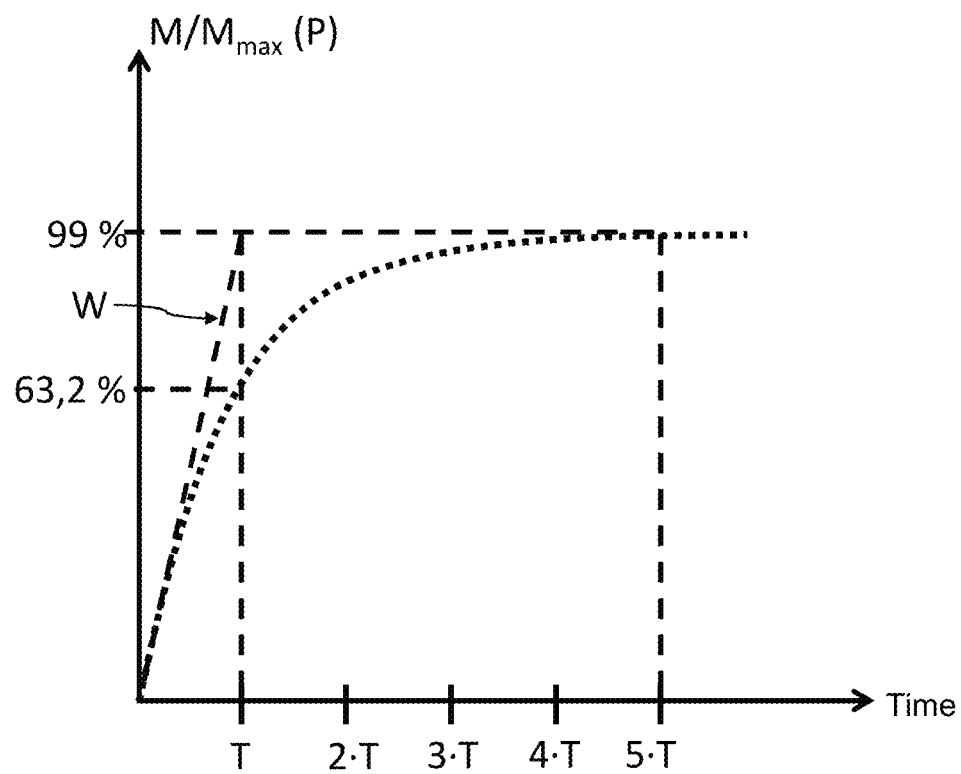
FIG. 3 depicts an advantageous course of the readings of a measuring cell in response to an abrupt increase of a detected infrared radiation in a schematic representation.

FIG. 3 shows the curve of a plurality of readings M normalized with respect to the maximum value $M_{Max}$ of the readings M in the static state. The curve of the readings M shown in FIG. 3 shows the course that the reading M takes when a sudden change in the intensity of the infrared radiation I occurs in the detection range 16 of the respective measuring cell 10. Each reading is shown by a point on the curve. The reading M increases continuously with time. After the time corresponding to the simple time constant T has elapsed, the reading M thereby assumes 63.2% of the associated maximum value $M_{Max}$. After the time constant has almost quintupled, i.e. 5T, the reading M corresponds to about 99% of the associated maximum value $M_{Max}$. FIG. 3 therefore shows the course of the periodically recorded readings M of a measuring cell 10 in the case of an abrupt increase in the intensity of the infrared radiation I, if the measuring cell 10 is designed as a first-order time delay element with an associated time constant T. In principle, a measuring cell 10 can also be represented by a higher-order time delay element. For the sake of simplicity, however, it will be assumed for further discussion that each measuring cell 10 is designed as a first-order time delay element with an associated time constant T.

When infrared radiation I is detected in the detection range 16 of a measuring cell 10 by the respective measuring cell 10, the infrared radiation I causes the measuring cell 10 to heat up, resulting in a change in the electrical resistance of the measuring cell 10. This change in electrical resistance can in turn be detected by the evaluation circuit to generate the measurement signal S. However, the heating of the measuring cell 10 also results in a heat flow Q from the respective measuring cell 10 via the associated connection 14 to the base body 12. This heat flow Q causes the base body 12 to heat up. The base body 12 has a predetermined thermal capacity such that the base body 12 can store heat that is transferred from a measuring cell 10 to the base body 12 via the associated connection 14. Therefore, a particularly intense heating of the measuring cell 10 or the heating of the measuring cell 10 over a longer period of time can lead to a non-negligible heating of the base body 12 despite the preferably low thermal conductivity of the connection 14 of a measuring cell 10.

Often, infrared radiation I does not occur permanently in the detection range 16 of a measuring cell 10. Therefore, there are also often time phases in which only a low intensity of infrared radiation I is in a detection range 16 of a measuring cell 10. This low intensity of infrared radiation I also leads to a heating—albeit very small—of the measuring cell 10. In principle, this infrared radiation I can be detected by means of the measuring cell 10. However, this detection is more difficult if the base body 12 has been heated beforehand. This is because, in this case, a heat flow Q from the base body 12 can also reach the respective measuring cell 10 via the connection 14, designed to detect the infrared radiation I with the low intensity from the associated detection range 16. The heat flow Q from the base body 12 to the measuring cell 10, therefore, causes a measurement error of the reading M, hence the reading M actually does not accurately represent the infrared radiation I occurring in the detection range 16.

Consequently, the reading M generated by a bolometric measuring cell 10 is subject not only to a disadvantageous time delay but also to a measurement error. Against this background, the processor unit 6 is preferably configured to compensate for the time delay of the reading M of a measuring cell 10 and thereby provide a predictive value P representing a predictive temperature in the detection range 16 of the respective measuring cell 10, wherein the predictive temperature or the predictive value P is compensated by the time delay, so that the predictive temperature V represented by the predictive value is a temperature in the detection range 16, which would occur after a time when the time constant T has quintupled. In other words, the predictive temperature is a temperature in the detection range 16 in the equilibrium state of the measuring cell 10. The predictive value P is adjusted for the time delay compared to the actual measuring cell 10 reading M and is therefore available much earlier than the equilibrium measuring cell M value. The predictive value P is therefore referred to as a predictive value P compensated according to the time delay.

The determination of the predictive value P for the reading M of a measuring cell 10 is preceded by the knowledge resulting from the schematic representation in FIG. 3 illustrating the exponential progression of the readings M. If the intensity of the infrared radiation I in the detection range 16 of a measuring cell 10 changes abruptly, the reading M initially increases almost linearly. If the infrared radiation I is periodically detected in the detection range 16 of the measuring cell 10, resulting in readings M being generated at a corresponding periodicity, an estimate of how large the reading M will be in the steady state at the time of 5T can be made using two successive readings M and the knowledge of the linear progression at the lower left end of the curve illustrated in FIG. 3. This estimated reading is then the predictive value P. The predictive value P can thus be determined from the slope of the dashed line W and the difference of two successive readings M. The slope W can be derived from the time constant T of the measuring cell 10.

In order to obtain a plurality of readings M representing the detected infrared radiation I in the detection range 16 of the respective measuring cell 10, a preferred embodiment provides for the detector array 4 to be designed to periodically detect infrared radiation I by means of the associated measuring cell 10, to generate a measurement signal S representing the readings M generated by the measuring cells 10, and to transmit the measurement signal S to the processor unit 6. In a preferred embodiment, the processor unit 6 is therefore configured to determine a predictive value P compensated with respect to the time delay of the respective measuring cell 10 for each current reading M of each measuring cell 10, based on the current reading M of the respective measuring cell 10 and at least one temporally preceding reading M of the same measuring cell 10, so that the respective predictive value P represents a current predictive temperature in the detection range 16 of the respective measuring cell 10 compensated with respect to the time delay.

The predictive value P can therefore indicate a prediction for the maximum value of the reading $M_{Max}$ of the respective measuring cell 10, which would occur if the infrared radiation I is measured at a constant intensity over a period of five times the time constant T of the measuring cell 10, i.e. 5T. Since the predictive value P represents the corresponding predictive temperature in the detection range 16 and the predictive value P can be determined before five times the time constant T, namely 5T, has elapsed, the predictive value P allows the predictive temperature to be determined particularly quickly. In other words, the time delay of the respective measuring cell 10 can be overcome computationally with the determination of the predictive value P.

However, it has been previously established that the reading M and thus also the predictive value P include a measurement error that falsifies the temperature represented by the reading M or the predictive temperature represented by the predictive value P, respectively. The corresponding measurement error is caused by a heat flow Q, which can occur between the respective measuring cell 10 and the base body 12. The measurement error depends on the body heat of the base body 12. Therefore, the invention envisages that the processor unit 6 is configured to determine a body heat stored by the base body 12 based on the thermal capacity of the base body 12, on the thermal conductivity of the connection 14, and on the measurement signal S. The measurement signal S represents the readings M detected by the measuring cells 10. The processor unit 6 may be configured, for example, to iteratively determine the body heat of the base body 12 using the temperatures represented by the readings M, the thermal capacity of the base body 12, and the thermal conductivity of the joint 14. The temperatures represented by the measurement signals S can be used, for example, to infer how substantial the heat flow Q is to the base body 12. In this context, it is also taken into account which body heat the base body 12 had previously (in the previous iteration step). When determining the body heat stored by the base body 12, the measurement signal S can also be taken into account indirectly, for example by using the predictive values P instead of the readings M. Once the body heat stored by the base body 12 is determined, this can be taken into account when correcting the predictive values P based on the measurement error, so that the processor unit 6 is preferably configured to determine, for each current predictive value P, a temperature value in the detection range 16 of the respective measuring cell 10 corrected according to the measurement error based on the respective predictive value P, on the thermal conductivity of the respective compound 14, and either directly or indirectly on the current body heat value.

The predictive value P for the detection range 16 of a measuring cell 10 represents the predictive temperature in the respective detection range 16. Based thereon, it can be derived which temperature is present at the respective measuring cell 10. Moreover, based on the current value of the body heat of the base body 12 and the aforementioned temperature of the measuring cell 10, it is possible to derive the direction of a heat flow Q between the measuring cell 10 and the base body 12 via the connection 14 of the associated measuring cell 10. This heat flow Q causes the measurement error. Therefore, if the heat flow Q is determined according to the previous explanation, a temperature value corrected according to the measurement error can be determined from the current predictive value P and the knowledge about the heat flow Q, which represents the corrected temperature in the detection range 16 of the respective measuring cell 10. The temperature value offers the advantage that it is freed from the aforementioned measurement error and, moreover, can be determined at a particularly quick pace in accordance with the predictive value P, namely well before the time when the time constant 5T quadruples lapses. In a preferred embodiment, the processor unit 6 is adapted to perform the steps previously explained.

Based on the determination of the temperature values for the plurality of detection ranges 16 of the corresponding number of measuring cells 10, it is possible to determine a thermal image reflecting the heat distribution in a space formed by the corresponding plurality of detection ranges 16 even when the detection ranges 16 partially overlap. In a preferred embodiment, the processor unit 6 is, therefore, configured to determine a thermal image based on the current temperature values for the detection ranges 16 of the measuring cells 10. This thermal image preferably represents the heat distribution in the aforementioned space. Furthermore, a preferred embodiment provides that the signal interface 8 be configured to provide and/or transmit an image signal E representing the thermal image.

The image signal E may have been previously determined by the processor unit 6. The signal interface 8 can be designed to transmit, in particular to send, the image signal E. The signal interface 8 can form a common unit 20 together with the processor unit 6. Alternatively or additionally, the signal interface 8 may form part of the processor unit 6. Thus, the signal interface 8 may form an integral part of the processor unit 6. The image signal E may be sent to other components of the system 2. However, it can also occur that the image signal E is sent to a device that is not part of the system 2.

Figure 4:
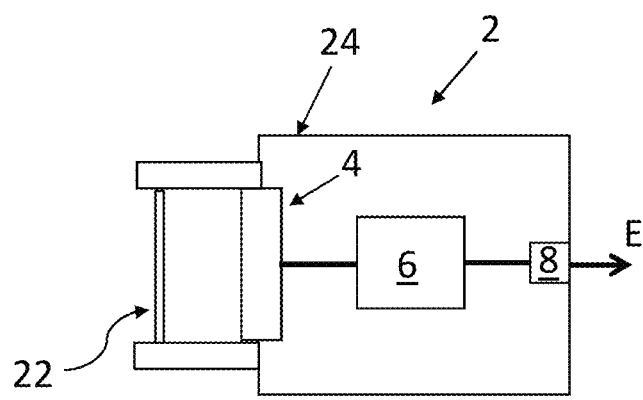
FIG. 4 is a schematic view of another exemplary system constructed in accordance with the teachings of the present disclosure.

FIG. 4 shows a schematic cross-sectional view of another advantageous embodiment of the system 2. The system 2 is formed by a thermal imaging camera. As previously, the system 2 also comprises the detector array 4, the processor unit 6, and the signal interface 8. The system 2 or the thermal imaging camera also comprises a lens 22 which is designed to focus infrared radiation I from the detection range 16 onto the measuring cells 10 of the detector array 4. Thus, the measuring cells 10 are arranged opposite to the lens 22. Furthermore, the detector array 4 is arranged on an outer side opposite to the lens 22 on the housing 24 of the thermal imaging camera or integrated into the corresponding outer side. In a preferred embodiment, the processor unit 6 and the signal interface 8 are arranged within the housing 24.

From the synopsis of FIGS. 1 and 4, it can also be seen that a signal connection exists between the detector array 4 and the processor unit 6. This signal connection is used to transmit the measurement signal S from the detector array 4 to the processor unit 6. A further signal connection may be formed between the processor unit 6 and the signal interface 8. In particular, if the signal interface 8 is formed separately from the processor unit 6. Otherwise, this signal connection can be dispensed with. The processor unit 6 can send the image signal E to the signal interface 8 via said signal connection, such that the image signal E can be further transmitted, in particular sent, by the signal interface 8.

It has already been explained previously that the detector array 4 is designed to periodically detect infrared radiation I by means of the associated measuring cells 10. In this context, a preferred embodiment provides that the detector array 4 is designed so that each measuring cell 10 periodically detects the infrared radiation I in the associated detection range 16 with a measuring period that is smaller than the time constant T of the respective measuring cell. It is also preferred that the detector array 4 is configured so that the measuring cells 10 periodically detect the infrared radiation I in the associated detection ranges 16 at a frequency of at least 20 Hz, at least 30 Hz, at least 50 Hz, or at least 100 Hz. The frequency mentioned refers to the frequency of acquisition for the respective measuring cell 10. The higher the frequency and the smaller the measuring period, the better and more accurate the predictive value can be determined, since it is now freed from the delay error that occurs due to the time lag of the measuring cell between the actually occurring infrared radiation I at the measuring cell 10 and the reading M of the respective measuring cell 10. It is therefore preferred that the measuring period of each measuring cell is less than half the time constant T of the respective measuring cell 10.

Figure 5:
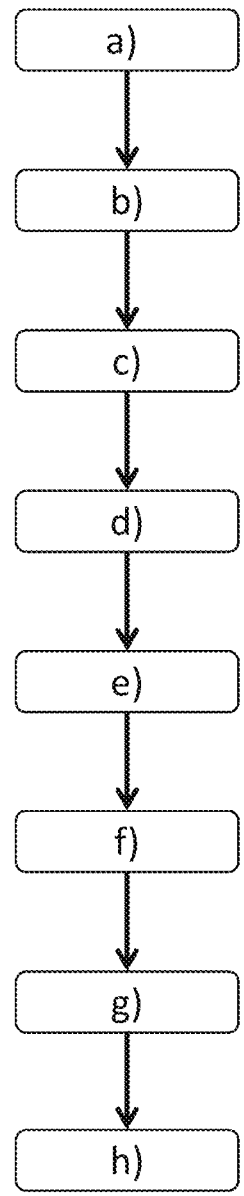
FIG. 5 is a schematic illustration in flow-chart form of an exemplary method performed in accordance with the teachings of the present disclosure.

FIG. 5 shows an advantageous embodiment of the method. The method is used to determine a thermal image by means of system 2. Thus, the system 2 is used to perform the method comprising steps a) to h) as explained below:
  a) periodically detecting infrared radiation I by means of the measuring cells 10 of the detector array 4;
  b) generating a measurement signal S representing the readings M generated by the measuring cells 10 by means of the detector array 4;
  c) transmitting the measurement signal S from the detector array 4 to the processor unit 6;
  d) determining a body heat 12 stored by the base body by means of the processor unit 6 and based on the thermal capacity, on the thermal conductivity and either directly or indirectly on the measurement signal S;
  e) determining a predictive value for each current reading M of each measuring cell 10 compensated with respect to the time delay of the respective measuring cell 10 by means of the processor unit 6 and based on the current reading M of the respective measuring cell 10 and at least one temporally preceding reading M of the same measuring cell 10, so that the predictive value P represents a current predictive temperature in the detection range 16 of the respective measuring cell [10] compensated with respect to the time delay;

f) determining, for each current predictive value P, a temperature value corrected for the measurement error in the detection range 16 of the respective measuring cell 10 by means of the processor unit 6 and based on the respective predictive value P, on the thermal conductivity and either directly or indirectly on the current value of the body heat;

g) determining a thermal image by means of the processor unit and based on the current temperature values for the detection ranges 16 of the measuring cells 10; and h) providing an image signal E using the signal interface 8, wherein the image signal E represents the thermal image.

With regard to the advantages and technical effects, reference is made to the advantageous explanations regarding FIGS. 1 to 4 as already set forth in connection with system 2.

Supplementally, it is worth pointing out that "comprising" does not exclude other elements or steps, and "a" or "one" does not exclude a plurality. It is also noteworthy that features described with reference to any of the above embodiments may also be used in combination with other features of other embodiments described above. Reference numbers in the claims must not be regarded as a limitation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE NUMERALS

E Image signal
I Infrared radiation
M Reading
P Predictive value
Q Heat flow
S Measurement signal
T Time constant
2 System
4 Detector array
6 Processor unit
8 Signal interface
10 Measuring cell
12 Base body
14 Connection
16 Detection range
18 Insulating layer
20 Common unit
22 Lens
24 Housing

What is claimed is:

1. A system for thermal imaging, comprising:
a detector array,
a processor, and
a signal interface,
wherein the detector array comprises a plurality of bolometric measuring cells and a base body comprising a predetermined thermal heat capacity,
wherein each measuring cell is directly or indirectly connected to the base body via an associated connection comprising a predetermined thermal conductivity, such that heat is transferable between each measuring cell and the base body,
wherein each measuring cell is configured to sense infrared radiation in a detection range associated with the respective measuring cell and as a time delay element comprising a time constant to generate a reading indicative of the sensed infrared radiation, representing a temperature in the detection range of the respective measuring cell and including a measurement error caused by a heat flow across the connection of the respective measuring cell to the base body,
wherein the detector array is configured to periodically detect infrared radiation by means of the associated measuring cells, generate a measurement signal representing the readings generated by the measuring cells, and transmit the measurement signal to the processor,
wherein the processor is configured to determine a body heat stored by the base body based on the thermal capacity, on the thermal conductivity, and either directly or indirectly on the measurement signal,
wherein the processor is therefore configured to determine a predictive value compensated with respect to the time delay of the respective measuring cell for each current reading of each measuring cell, based on the current reading of the respective measuring cell and at least one temporally preceding reading of the same measuring cell, so that the respective predictive value represents a current predictive temperature in the detection range of the respective measuring cell compensated with respect to the time delay,
wherein the processor is configured to determine, for each current predictive value, a temperature value in the detection range of the respective measuring cell corrected for the measurement error, based on the respective predictive value, on thermal conductivity, and either directly or indirectly on the current body heat value,
wherein the processor is configured to determine a thermal image based on the current temperature values for the detection range of the measuring cell, and
wherein the signal interface is configured to provide an image signal representing the thermal image.

2. The system of claim 1, wherein the processor is configured to determine a parameter vector representing a heat distribution in the base body based on the thermal capacity, on the thermal conductivity and either directly or indirectly on the measurement signal, wherein the processor is configured to determine for each current predictive value, to determine the temperature value corrected for the measurement error in the detection range of the respective measuring cell based on the respective predictive value, on the thermal conductivity, either directly or indirectly on the current value of the body heat and additionally based on the parameter vector.

3. The system of claim 1, wherein each measuring cell comprises a sensor layer for absorbing infrared radiation, the base body comprises a substrate with a readout circuit, and each measuring cell is connected to the base body via associated electrodes, so that the electrodes of a measuring cell form the connection of the respective measuring cell to the base body.

4. The system of claim 1, wherein the processor is configured to determine the body heat stored by the base body based on the thermal capacity, on the thermal conductivity and on the predictive values.

5. The system of claim 1, wherein the processor is configured to determine the body heat based on the most recently determined body heat, thermal capacity, thermal conductivity, and either the at least one current reading or the at least one current predictive value.

6. The system of claim 5, wherein the processor is configured to determine a body temperature based on the thermal capacity of the base body and the current value of the body heat, and wherein the processor is configured to determine the temperature value in the detection range of the respective measuring cell corrected according to the measurement error for each current predictive value based on the predictive value of the respective measuring cell, the thermal conductivity of the connection to the respective measuring cell and the current value of the body temperature of the base body.

7. The system of claim 1, wherein the detector array is designed such that each measuring cell periodically detects the infrared radiation in the associated detection range with a measuring period that is smaller than the time constant of the respective measuring cell, so that each reading presents a time delay error.

8. The system of claim 7, wherein the time constant of each measuring cell is determined by a thermal resistance of the respective measuring cell and a thermal capacitance of the respective measuring cell.

9. The method of claim 7, wherein the measuring period is less than half the time constant of the respective measuring cell.

10. The system of claim 1, wherein the processor is configured to calculate the predictive value for the temperature in the detection range of a measuring cell by extrapolating the readings of the respective measuring cell or by multiplying a differential value, which is determined by the difference between the current reading of the respective measuring cell and a previous reading of the same measuring cell, by a predetermined factor between 0.5 and 0.8, in particular by a factor of 0.632.

11. The system of claim 1, wherein the detector array is designed so that the measuring cells periodically detect the infrared radiation in the associated detection ranges at a frequency of at least 20 Hz.

12. The system of claim 1, wherein the processor is configured to filter the readings received via the measurement signal by means of a low-pass filter, so that the resulting readings serve to determine the body heat and/or predictive values.

13. A method for thermal imaging by means of a system comprising a processor, a signal interface and a detector array comprising a plurality of bolometric measuring cells and a base body with a predetermined, thermal capacity, wherein each measuring cell is directly or indirectly connected to the base body via an associated connection comprising a predetermined thermal conductivity, such that heat is transferable between each measuring cell and the base body, wherein each measuring cell is designed for detecting infrared radiation in a detection range associated with the respective measuring cell and as a time delay element with a time constant for generating a reading representing the detected infrared radiation, which reading represents a temperature in the detection range of the respective measuring cell and includes a measurement error caused by a heat flow via the connection of the respective measuring cell to the base body, and wherein the method comprises the following steps:
  a) periodically detecting infrared radiation by means of the measuring cells of the detector array;
  b) generating a measurement signal representing the readings generated by the measuring cells by means of the detector array;
  c) transmitting the measurement signal from the detector array to the processor;
  d) determining a body heat stored by the base body by means of the processor and based on the thermal capacity, on the thermal conductivity and either directly or indirectly on the measurement signal;
  e) determining a predictive value for each current reading of each measuring cell compensated with respect to the time delay of the respective measuring cell by means of the processor and based on the current reading of the respective measuring cell and at least one temporally preceding reading of the same measuring cell, so that the predictive value represents a current predictive temperature in the detection range of the respective measuring cell compensated with respect to the time delay;
  f) determining, for each current predictive value, a temperature value corrected for the measurement error in the detection range of the respective measuring cell by means of the processor and based on the respective predictive value, on the thermal conductivity and either directly or indirectly on the current value of the body heat;
  g) determining a thermal image by means of the processor and based on the current temperature values for the detection ranges of the measuring cells; and
  h) providing an image signal using the signal interface, wherein the image signal represents the thermal image.

14. The method of claim 13, wherein the method comprises a further step d.1) to be carried out before step e) or f):
  d.1) determining a parameter vector representing a heat distribution in the base body by means of the processor based on the thermal capacity, on the thermal conductivity and either directly or indirectly on the measurement signal.

15. The method of claim 13, wherein the body heat stored by the base body is determined in step d) based on the thermal capacity, on the thermal conductivity and the predictive values by means of the processor.

* * * * *